(12) United States Patent
Schwenter et al.

(10) Patent No.: US 11,783,976 B2
(45) Date of Patent: Oct. 10, 2023

(54) COIL AND TRANSFORMER HAVING SUCH A COIL

(71) Applicant: Endress+Hauser Flowtec AG, Reinach (CH)

(72) Inventors: Benjamin Schwenter, Aesch (CH); Claude Hollinger, Aesch (CH); Marc Werner, Grenzach-Wyhlen (DE); Martin Stucki, Pratteln (CH)

(73) Assignee: Endress+Hauser Flowtec AG, Reinach (CH)

( * ) Notice: Subject to any disclaimer, the term of this patent is extended or adjusted under 35 U.S.C. 154(b) by 289 days.

(21) Appl. No.: 16/637,486

(22) PCT Filed: Jul. 12, 2018

(86) PCT No.: PCT/EP2018/068895
§ 371 (c)(1),
(2) Date: Feb. 7, 2020

(87) PCT Pub. No.: WO2019/029941
PCT Pub. Date: Feb. 14, 2019

(65) Prior Publication Data
US 2020/0251265 A1    Aug. 6, 2020

(30) Foreign Application Priority Data

Aug. 9, 2017   (DE) ..................... 10 2017 118 108.3
Sep. 13, 2017   (DE) ..................... 10 2017 121 157.8

(51) Int. Cl.
*H01F 5/04*       (2006.01)
*H01F 5/02*       (2006.01)
(Continued)

(52) U.S. Cl.
CPC ................. *H01F 5/04* (2013.01); *G01F 1/84* (2013.01); *H01F 5/02* (2013.01); *H01F 7/02* (2013.01);
(Continued)

(58) Field of Classification Search
None
See application file for complete search history.

(56) References Cited

U.S. PATENT DOCUMENTS 2,982,888 A    5/1961   Whearley
3,223,553 A   12/1965   Morey
(Continued)

FOREIGN PATENT DOCUMENTS

| EP | 0364054 A2 | 4/1990 |
| JP | 2005223279 A | 8/2005 |
| WO | 2017122452 A1 | 7/2017 |

*Primary Examiner* — Paul M. West
*Assistant Examiner* — Mark A Shabman
(74) *Attorney, Agent, or Firm* — Mark A. Logan; Endress+Hauser (USA) Holding, Inc.

(57) ABSTRACT

The coil comprises a coil carrier, a coil wire at least partially surrounded by an insulating layer and wound around the coil carrier, as well as a protective cover layer at least partially covering the coil wire wound around the coil carrier. The coil wire is composed, at least partially, of silver, the insulating layer surrounding the coil wire is composed, at least partially, of a ceramic material, and the protective cover layer is composed, at least partially, of a ceramic material and/or a glass.

9 Claims, 5 Drawing Sheets

(51) Int. Cl.
*H01F 7/02* (2006.01)
*H01F 17/03* (2006.01)
*G01F 1/84* (2006.01)
*H01F 27/28* (2006.01)
*H01F 27/32* (2006.01)

(52) U.S. Cl.
CPC ......... *H01F 17/03* (2013.01); *H01F 27/2823* (2013.01); *H01F 27/32* (2013.01); *G01F 1/8481* (2013.01); *G01F 1/8486* (2013.01)

(56) References Cited

U.S. PATENT DOCUMENTS

| | | | |
|---|---|---|---|
| 3,308,414 A | | 3/1967 | Ostrander et al. |
| 4,876,898 A | * | 10/1989 | Cage .................... G01F 1/8477 73/861.355 |
| 5,374,810 A | | 12/1994 | Gantt |
| 2004/0221661 A1 | | 11/2004 | Bitto et al. |
| 2013/0055827 A1 | * | 3/2013 | Bierweiler ............ G01F 1/8431 73/861.355 |
| 2016/0313162 A1 | * | 10/2016 | Bitto ......................... H01F 5/02 |
| 2018/0166216 A1 | | 6/2018 | Adachi |

\* cited by examiner

COIL AND TRANSFORMER HAVING SUCH A COIL

CROSS-REFERENCE TO RELATED APPLICATIONS

The present application is related to and claims the priority benefit of German Patent Application Nos. 10 2017 118 108.3, filed Aug. 9, 2017 and 10 2017 121 157.8, filed on Sep. 13, 2017, and International Patent Application No. PCT/EP2018/068895 filed on Jul. 12, 2018the entire contents of which are incorporated herein by reference.

TECHNICAL FIELD

The invention relates to a coil, especially a coil for application in a transformer, or transducer, of vibration-type, not least of all also a coil suitable for constructing an oscillation exciter and/or an oscillation sensor. Furthermore, the invention relates to a measuring transducer of vibration-type having such a coil.

BACKGROUND

Vibronic measuring devices formed by means of a measuring device-electronics (usually including at least one microprocessor) as well as by means of a measuring transducer of vibration-type electrically connected with the measuring device-electronics and flowed through during operation by the medium to be measured are used in industrial measurements technology (especially in connection with the control and monitoring of automated production processes) for highly accurate measuring of one or more measured variables, especially mass flow rate, density and/or viscosity, of the medium, for example, a liquid or a gas, flowing in a process line, for example, a pipeline. Such-measuring devices, for example, those embodied as so-called four-conductor- or even as so-called two conductor measuring devices, have been known for a long time, not least of all also in the form of Coriolis-mass flow-/density or viscosity-density-measuring devices, and are established in industrial use. Examples of such vibronic measuring devices, or measuring transducers suitable therefor, are described in, among others, US-A 2002/0157480, US-A 2004/0123645, US-A 2004/0221661, US-A 2006/0081069, US-A 2006/0096390, US-A 2007/0062309, US-A 2007/0119264, US-A 2008/0047362, US-A 2008/0190195, US-A 2008/0250871, US-A 2010/0005887, US-A 2010/0011882, US-A 2010/0257943, US-A 2011/0161017, US-A 2011/0219872, US-A 2011/0265580, US-A 2012/0123705, US-A 2013/0042700, US-A 2016/0313162, U.S. Pat. Nos. 4,491,009, 4,524,610, 4,756,198, 4,777,833, 4,801,897, 4,876,898, 4,996,871, 5,287,754, 5,291,792, 5,349,872, 5,531,126, 5,705,754, 5,796,010, 5,796,011, 5,831,178, 5,945,609, 5,965,824, 6,006,609, 6,092,429, 6,223,605, 6,311,136, 6,477,901, 6,513,393, 6,651,513, 6,666,098, 6,711,958, 6,840,109, 6,920,798, 7,017,424, 7,077,014, 7,200,503, 7,216,549, 7,325,462, 7,360,451, 7,792,646, WO-A 00/34748, WO-A 01/02816, WO-A 2007/043996, WO-A 2008/059262, WO-A 2013/092104, WO-A 85/05677, WO-A 88/02853, WO-A 89/00679, WO-A 94/21999, WO-A 95/03528, WO-A 95/16897, WO-A 95/29385, WO-A 98/02725, or WO-A 99/40394.

SUMMARY

The measuring transducers of the measuring devices shown therein comprise at least one, at least sectionally straight and/or at least sectionally curved, e.g. U-, V-, S-, Z- or Ω-curved, measuring tube having a lumen surrounded by a tube wall and conveying the medium.

The at least one measuring tube of such a measuring transducer is adapted to convey medium in the lumen and during that to be caused to vibrate such that it executes wanted oscillations, namely mechanical oscillations about a rest position with a wanted frequency related to the density of the medium, consequently a wanted frequency usable as a measure of density. In the case of conventional vibronic measuring devices, typically bending oscillations at a natural resonant frequency serve as wanted oscillations, for example, such bending oscillations, which correspond to a measuring transducer inherent, natural, bending oscillation, fundamental mode, in which the oscillations of the measuring tube are such resonant oscillations, which have exactly one oscillatory antinode. The wanted oscillations in the case of an at least sectionally curved measuring tube are additionally typically so embodied that the measuring tube moves about an imaginary oscillation axis imaginarily connecting an inlet side and an outlet-side end of the measuring tube in a pendulum-like fashion, in the manner of a cantilever clamped at one end, while, in contrast, in the case of measuring transducers having a straight measuring tube, the wanted oscillations are most often bending oscillations in a single imaginary plane of oscillation. It is, additionally, known, for the purpose of performing repeating checking of the measuring transducer during operation of the measuring device, to excite the at least one measuring tube, at times, also for significant amounts of time, to execute oscillations outside of resonance, as well as to evaluate such oscillations outside of resonance, for example, in order, such as described in the aforementioned US-A 2012/0123705, to be able to detect, as early as possible, damage to the at least one measuring tube, which can bring about an undesired lessening of the accuracy of measurement, and/or an undesired lessening of the operational safety, of the particular measuring device.

In the case of measuring transducers with two measuring tubes, these are most often connected into the particular process line via a distributor piece extending on the inlet side between the measuring tubes and an inlet side connecting flange as well as via a distributor piece extending on the outlet-side between the measuring tubes and an outlet-side connecting flange. In the case of measuring transducers having a single measuring tube, such communicates with the process line most often via a connecting tube communicating with the inlet side as well as via a connecting tube communicating with the outlet-side. Furthermore, measuring transducers having a single measuring tube comprise, in each case, at least one counteroscillator embodied as one piece or a plurality of parts, for example, a tube-, box- or plate-shaped counteroscillator, which is coupled to form a first coupling zone on the inlet side of the measuring tube and to form a second coupling zone on the outlet-side on the measuring tube, and which, during operation, essentially either rests or oscillates oppositely to the measuring tube. The inner part of the measuring transducer formed by means of measuring tube and counteroscillator is most often held only by means of the two connecting tubes, via which the measuring tube communicates with the process line during operation, in a protective measuring transducer housing, especially in a manner enabling oscillations of the inner part relative to the measuring transducer housing. In the case of the measuring transducers having a single, essentially straight, measuring tube shown, for example, in U.S. Pat. Nos. 5,291,792, 5,796,010, 5,945,609, 7,077,014, US-A 2007/0119264, WO-A 01/02816 or even WO-A 99/40394, the measuring tube and the counteroscillator are, such as quite usual in the case of conventional measuring transducers, oriented essentially coaxially relative to one another, in that the counteroscillator is embodied as an essentially straight, hollow cylinder and the measuring transducer is then arranged such that the measuring tube is at least partially surrounded by the counteroscillator. Typical materials for such counteroscillators, especially also in the case of application of titanium, tantalum or zirconium for the measuring tube, comprise, most often, comparatively cost effective steel types, such as, for instance, structural steel or free-machining steel.

For active exciting and maintaining of oscillations of the at least one measuring tube, not least of all also the wanted oscillations, measuring transducers of vibration-type have, additionally, at least one electromechanical oscillation exciter acting during operation differentially on the at least one measuring tube and the, in given cases, present counteroscillator, or the, in given cases, present other measuring tube. The oscillation exciter, electrically connected with the measuring device-electronics by means of a pair of electrical connection lines, for example, in the form of connection wires and/or in the form of conductive traces of a flexible printed circuit board, serves, when operated by an electrical excitation signal generated by the measuring device-electronics and appropriately conditioned, namely at least adapted to changing oscillation characteristics of the at least one measuring tube, especially to convert an electrical excitation power supplied by means of the excitation signal into a driving force acting on a point of engagement formed by the oscillation exciter on the at least one measuring tube.

Oscillation exciters of usually marketed measuring transducers of vibration-type are typically constructed in the manner of an oscillation coil working according to the electrodynamic principle, namely composed of a coil (which, in the case of measuring transducers having a measuring tube and a counteroscillator coupled thereto, is most often secured to the latter), as well as, interacting with the at least one coil and serving as armature, a permanent magnet (which is then secured to the measuring tube). The permanent magnet and the coil are, in such case, usually so oriented relative to one another that they are essentially coaxial. Additionally, in the case of conventional measuring transducers, the oscillation exciter is most often so embodied and placed that it acts essentially centrally on the at least one measuring tube. Alternatively to one oscillation exciter acting centrally and directly on the measuring tube, such as mentioned in the above U.S. Pat. No. 6,092,429, also two oscillation exciters can be used, secured not at the halfway point of the measuring tube, but rather on the in-, and outlet-sides, for the active exciting of mechanical oscillations of the at least one measuring tube or, such as provided in U.S. Pat. Nos 6,223,605 and 5,531,126, for example, also exciter mechanisms formed by means of an oscillation exciter acting between the, in given cases, present counteroscillator and the measuring transducer housing can be used.

For registering oscillatory movements of the at least one measuring tube, not least of all also oscillatory movements corresponding to the wanted oscillations, measuring transducers of the type being discussed have, furthermore, at least one oscillation sensor placed at the measuring tube, for example, electrically connected with the measuring device-electronics by means of a suitable pair of electrical connection lines, and adapted to transduce the oscillatory movements into an oscillation measurement signal representing the oscillatory movements and containing a signal frequency corresponding to the wanted frequency, and to provide the oscillation measurement signal to the measuring device-electronics, for example, a measuring- and operating circuit of the measuring device-electronics formed by means of at least one microprocessor, for additional processing. In the case of measuring transducers of usually marketed vibronic density-measuring devices, the oscillation sensors are most often likewise of the electrodynamic type, and, consequently, constructed in the manner of a solenoid. Accordingly, also the oscillation sensors of such a sensor arrangement are most often likewise formed, in each case, by means of a permanent magnet secured to the measuring tube and at least one coil permeated by a magnetic field of the permanent magnet, for example, a coil secured to the, in given cases present, other measuring tube or to the, in given cases present, counteroscillator, which coil provides, at least at times, an induced measurement voltage as a result of the oscillatory movements of the at least one measuring tube.

As is known, due to the wanted oscillations of the at least one measuring tube,—not least of all also for the case that the wanted oscillations of the at least one measuring tube are bending oscillations—Coriolis forces dependent on the instantaneous mass flow rate can be induced in the flowing medium. These can, in turn, bring about Coriolis oscillations with the wanted frequency. These Coriolis oscillations vary as a function of the mass flow rate and are superimposed on the wanted oscillations, in such a manner that between inlet side and outlet-side oscillatory movements of the at least one measuring tube, executing wanted oscillations and simultaneously flowed through by the medium, a phase difference also dependent on the mass flow rate, consequently also usable as a measure for the mass flow measurement travel time, can be detected. In the case of an at least sectionally curved measuring tube, in the case of which there is selected for the wanted oscillations an oscillation form, in which the measuring tube is caused to move like a pendulum in the manner of a cantilever fixed on one end, the resulting Coriolis oscillations correspond, for example to that bending oscillation mode (sometimes also referred to as a twist mode), in which the measuring tube executes rotary oscillations about an imaginary rotary oscillation axis directed perpendicularly to the mentioned imaginary oscillation axis, while, in contrast, in the case of a straight measuring tube, whose wanted oscillations are embodied as bending oscillations in a single imaginary plane of oscillation, the Coriolis oscillations are, for example, developed as bending oscillations essentially coplanar with the wanted oscillations. For the case already mentioned above, in which the measuring device should ascertain, supplementally to density, additionally also the mass flow rate of the medium conveyed in the measuring transducer, measuring transducers of the type being discussed have, for the purpose of registering both inlet side as well as also outlet-side oscillatory movements of the at least one measuring tube and for producing at least two electrical oscillation measurement signals influenced from the mass flow rate to be measured, furthermore, spaced from one another along the measuring tube, most often two or more oscillation sensors, which are so embodied and arranged that the oscillation measurement signals generated therewith and fed to the measuring device electronics have not only, such as already mentioned, in each case, a wanted signal component but also a mass flow rate dependent phase difference measurable between the wanted signal components of the two oscillation measurement signals. Alternatively or supplementally to measurement of the mass flow rate and the density, it is—such as already mentioned, and as indicated in the above referenced US-A 2011/0265580— additionally, also possible to measure by means of such measuring transducers of vibration-type, consequently by means of vibronic density-measuring devices formed therewith, supplementally also a viscosity of the through flowing medium, for example, based on an electrical excitation power required for exciting and maintaining the wanted oscillations, or based on a damping of the wanted oscillations, as ascertained from the excitation power, and to output such in the form of qualified viscosity measured values.

A coil applied in the case of a measuring transducer of the type being discussed—, for example, for forming an oscillation exciter or an oscillation sensor—includes—such as shown in US-A 2016/0313162—typically, a coil carrier, for example, a coil carrier of plastic and/or ceramic and/or metal, having a straight passageway extending from a first end of the coil carrier formed by a first end face to a second end of the coil carrier distal to the first end and formed by a second end face, especially a second end face parallel to the first end face. Wound around the coil carrier is coil wire of an electrically conductive material, for example, a noble metal, such as gold, silver and/or platinum, or an alloy thereof, for example, coil wire surrounded by a coating of an electrically insulating lacquer layer. The final mounting of such a coil occurs, typically, by attaching the coil carrier carrying the coil wire to the counteroscillator, or to the measuring tube, of the measuring transducer using a screw positioned in the passageway of the coil carrier and thereafter, thus with coil located in its installed position, each of the two connection lines is electrically conductively connected, for example, manually soldered, with their ones of the two ends of the coil wire.

A factor limiting the areas of application for measuring transducers of the above-described type is the operating temperature, to which the coils can be exposed. Described in the above cited US-A 2004/0221661 is a coil, which, for implementing higher operating temperatures, has a protective cover layer of a high temperature resistant, ceramic and/or glass like material covering the coil wire wound on the coil body, and, formed in the coil body, an external thread, in which the coil wire is embedded. Application of such a coil has, however, only been successful at operating temperatures up to about 300 C.

An object of the invention is so to improve coils of the aforementioned type that application is enabled for operating temperatures above 350° C., especially above 400° C.

For achieving the object, the invention resides in a coil, for example, for a measuring transducer of vibration-type, comprising:
 a coil carrier;
 a coil wire at least partially surrounded by an insulating layer and wound around the coil carrier; as well as
 a protective cover layer at least partially covering the coil wire wound around the coil carrier;
 wherein the coil wire is composed, at least partially of silver or a silver-alloy;
 wherein the insulating layer surrounding the coil wire is composed, at least partially of a ceramic material; and
 wherein the protective cover layer is composed, at least partially of a ceramic and/or glass material.

Moreover, the invention resides also in a measuring transducer of vibration-type, comprising:
 at least one measuring tube, for example, an at least sectionally straight and/or at least sectionally curved, measuring tube, which has a lumen surrounded by a tube wall and which is adapted to convey in the lumen a flowable medium, for example, a gas and/or a liquid, and during that to be caused to vibrate, for example, in such a manner that the tube executes mechanical oscillations about a static rest position thereof, which mechanical oscillations are suitable to induce in the flowing medium Coriolis forces dependent on a mass flow rate, and/or that the tube executes mechanical oscillations about a static rest position thereof, which mechanical oscillations are suitable to induce in the flowing medium frictional forces dependent on a viscosity of the medium, and/or that the tube executes mechanical oscillations about a static rest position thereof, which mechanical oscillations are suitable to induce in the flowing medium inertial forces dependent on a density of the medium;
 a permanent magnet connected with the at least one measuring tube, for example, secured externally to its tube wall; as well as
 a coil of the invention, wherein the coil is permeated by a magnetic field of the permanent magnet.

Additionally, the invention resides also in a measuring system for measurement of at least one measured variable, especially a temperature, a density and/or a viscosity, of a flowing fluid and/or a fluid having a temperature greater than 350° C., especially greater than 400° C., especially a gas, a liquid or a flowable dispersion, which measuring system comprises a measuring- and operating electronics, especially a measuring- and operating electronics formed by means of a microprocessor, as well as a measuring transducer for conveying the medium.

In a first embodiment of the coil of the invention, it is provided that both a first subsection of the coil wire, especially a first subsection led along a first surface element of the coil carrier, as well as also a second subsection of the coil wire spaced therefrom, especially a second subsection led along a second surface element of the coil carrier spaced from the first surface element, are, in each case, secured to the coil carrier by means of a ceramic adhesive, for example, a 1-component or 2-component, ceramic adhesive, contacting the subsections and surface elements.

In a second embodiment of the coil of the invention, it is provided that its coil carrier is composed, at least partially, for example, predominantly or completely, of a ceramic material, for example, a ceramic material containing zirconium oxide ($ZrO_2$), for example, a Y-stabilized $ZrO_2$ ceramic.

In a third embodiment of the coil of the invention, it is provided that the protective cover layer at least partially covering the coil wire wound around the coil carrier is composed predominantly or completely of ceramic material.

In a fourth embodiment of the coil of the invention, it is provided that the coil wire is wound with more than one ply around the coil carrier.

In a fifth embodiment of the coil of the invention, it is provided that the protective cover layer at least partially covering the coil wire wound around the coil carrier is predominantly or completely composed of glass.

In a sixth embodiment of the coil of the invention, it is provided that the protective cover layer (13) contains zinc oxide (ZnO), especially at a mass fraction of 3-12%, and/or boron trioxide ($B_2O_3$), especially at a mass fraction of 5-15 m %, and/or aluminum oxide ($Al_2O_3$), especially at a mass fraction of 1-5%, and/or bismuth oxide ($Bi_2O_3$), especially at a mass fraction of 60-75%.

In a seventh embodiment of the coil of the invention, it is provided that the material of the protective cover layer at least partially covering the coil wire wound around the coil carrier conforms to EU-Directive 2011/65/EU (ROHS 2) and/or has the CAS Registry Number 65997-17-3

In an eighth embodiment of the coil of the invention, it is provided that the protective cover layer covers the coil wire wound around the coil carrier predominantly or completely.

In a ninth embodiment of the coil of the invention, it is provided that the coil carrier is circularly cylindrically and/or is composed, at least partially of ceramic.

In a tenth embodiment of the coil of the invention, it is provided that the coil wire has a wire diameter of less than 0.5 mm and/or not less than 0.05 mm.

In an eleventh embodiment of the coil of the invention, it is provided that the coil wire is composed predominantly or completely of silver.

In a twelfth embodiment of the coil of the invention, it is provided that the coil wire is composed, at least partially of fine silver.

In a thirteenth embodiment of the coil of the invention, it is provided that the coil wire is composed, at least partially of AgNiO 15.

A basic idea of the invention is to increase the temperature resistance of the coil by using as coil wire a wire of silver jacketed by a high temperature resistant, equally as well, flexible, insulating layer of ceramic material, and by providing supplementally to the insulating layer yet another protective cover layer of ceramic material, or glass, at least partially covering the coil wire. In this way, it is possible to produce, in simple manner, a mechanically strong composite, which is equally as well, durable for high operating temperatures, e.g. temperatures above 350° C.

BRIEF DESCRIPTION OF THE DRAWINGS

The invention as well as other advantageous embodiments thereof will now be explained in greater detail based on examples of embodiments shown in the figures of the drawing. Equal parts are provided in all figures with equal reference characters; when perspicuity requires or it otherwise appears sensible, reference characters already shown in earlier figures are omitted in subsequent figures. Other advantageous embodiments or further developments, especially also combinations of, firstly, only individually explained aspects of the invention, result, furthermore, from the figures of the drawing, as well as also the dependent claims per se. The figures of the drawing show as follows:

DETAILED DESCRIPTION

Figure 1:
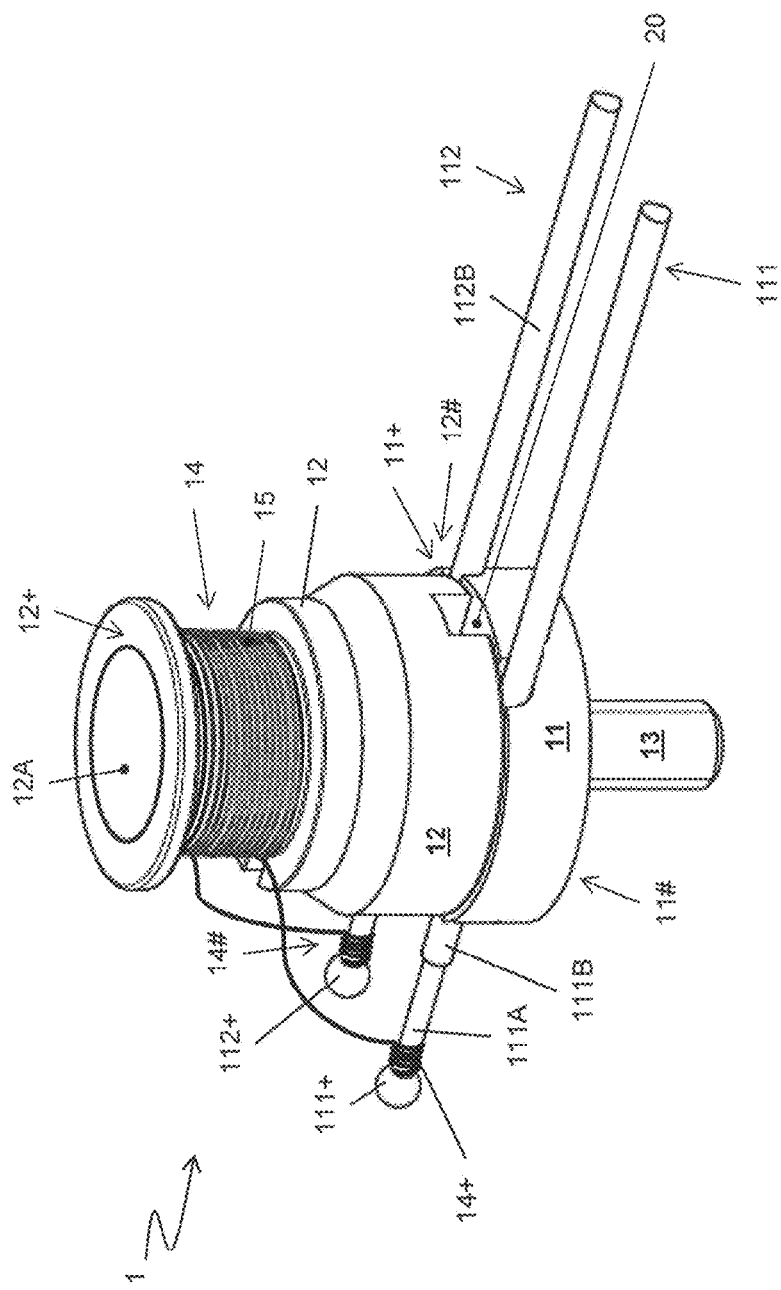
FIGS. 1, 2, and 3 show in different, partially exploded views, an example of an embodiment of a coil of the present disclosure, serving, for example, as a component of a measuring transducer of vibration-type, or as a component of a vibronic measuring device formed therewith.
Figure 2:
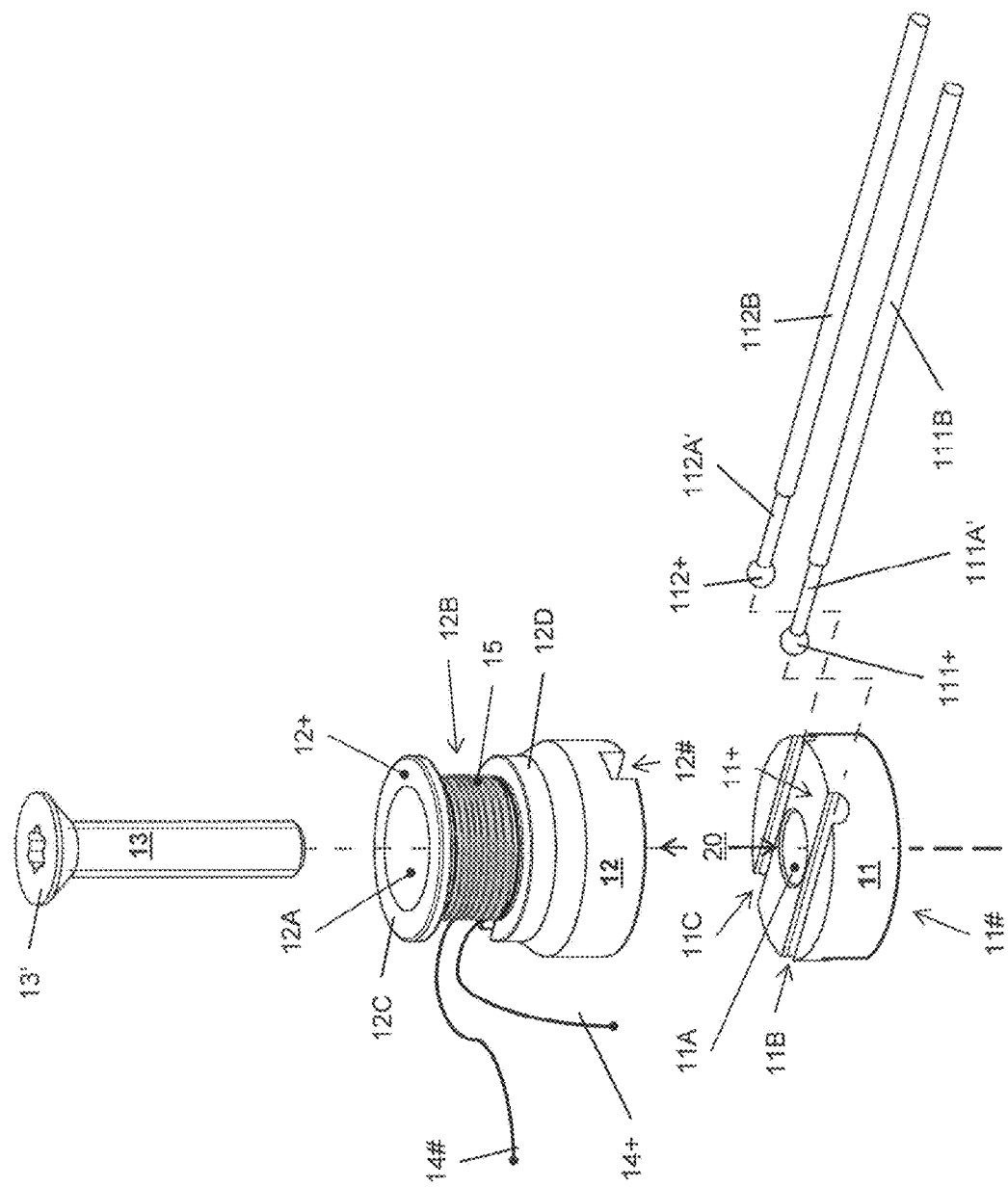
Figure 3:
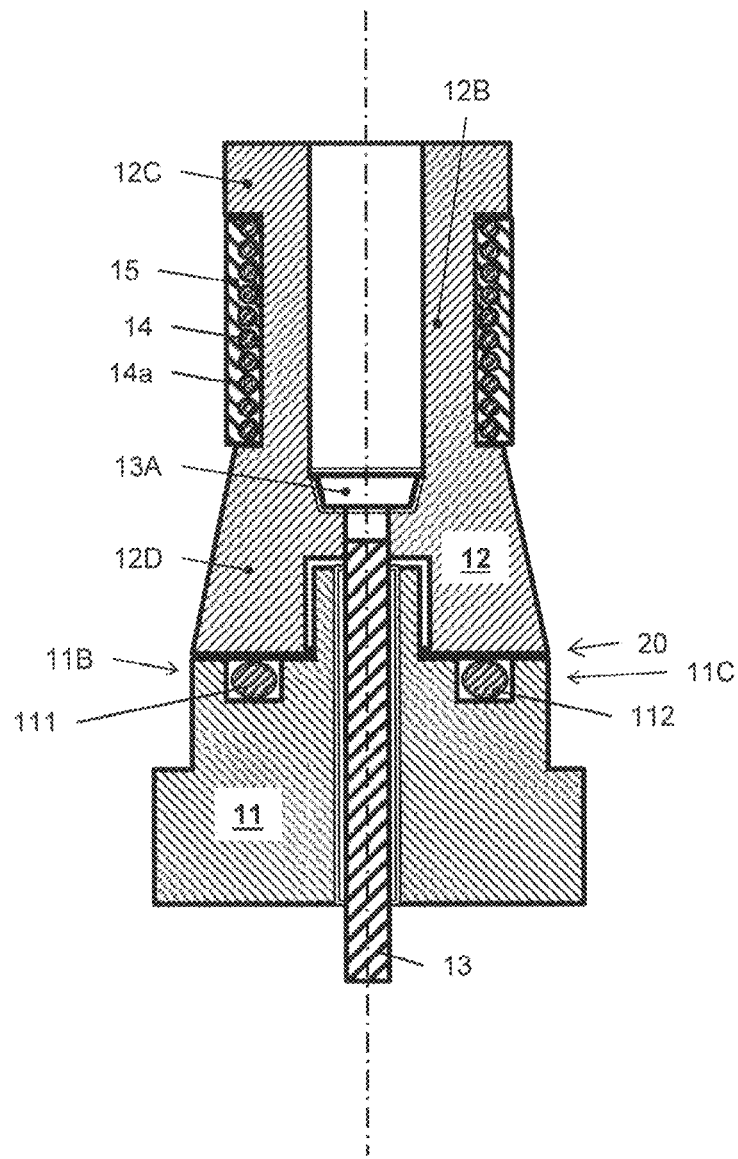

Shown in FIGS. 1, 2 and 3 is an example of an embodiment of a coil 1 of the invention serving, for example, as a component of a measuring transducer of vibration-type, or as a component of a vibronic measuring system formed therewith. Coil 1 is, especially, embodied as a high temperature resistant coil, namely a coil suitable for operating temperatures above 350° C., especially also above 400° C.

Coil 1 comprises, for example, a circularly cylindrical, coil carrier 12 having a first end 12+ formed by a first end face and a second end 12# distal to the end 12+, formed, for example, by a second end face parallel to the first end face, and a coil wire 14 wound around the coil carrier. Coil wire 14 can be, for example, one ply wound around the coil carrier. In an additional embodiment of the invention, the coil wire is present as more than one ply, namely wound around the coil carrier in two or more plies lying on top of one another. The—here circularly cylindrical—coil carrier 12 can, in turn, be manufactured, for example, of a metal material, for example, steel or titanium, or a titanium-alloy. Coil support 12 can, however, also be made of a ceramic. Accordingly, in an additional embodiment of the invention, it is provided that the coil carrier 12 is composed, at least partially, for example, predominantly or completely, of a ceramic material, for example, especially a zirconium oxide ($ZrO_2$) containing, or Y-stabilized $ZrO_2$, ceramic. In an additional embodiment of the invention, the coil wire 14 has a wire diameter of less than 0.5 mm and/or of not less than 0.05 mm. Particularly for the case, in which the coil wire 14 is wound as only one ply on the coil carrier 12, it can be provided, as well as also indicated in the above cited US-A 2006/0081069, that an external thread is formed in the coil carrier 12 for accommodating the coil wire 14 and the coil wire is placed in the helical groove of the external thread.

Coil wire 14 of the invention is composed, at least partially, especially predominantly or completely, of silver, for example, a fine silver, or a silver-alloy, such as e.g. AgNiO 15. Moreover, the coil wire 14 of the invention is at least partially jacketed by an insulating layer 14a. The insulating layer 14a surrounding the coil wire is composed, at least partially, especially predominantly or completely, of an, especially high temperature resistant, ceramic material. The ceramic material can contain, for example, aluminum oxide ($Al_2O_3$) and/or silicon oxide ($SiO_3$). In an additional embodiment of the invention, the material, or the insulating layer 14a formed therewith, is a high temperature resistant, equally as well, flexible, insulation, for example, that, or of the type, provided by the firm, California Fine Wire, Grover Beach, CA, USA, under the trademark Alcal "E".

The coil wire 14 of the coil of the invention wound on the coil carrier 12 is, furthermore, coated with a protective cover layer 15 of an, especially electrically poorly or non-conducting, temperature-resistant material, in such a manner that the coil wire 14—, as well as also evident in FIG. 1, 2 or 3, and their combination—is at least partially, especially predominantly or completely, covered by the protective cover layer 13 and/or at least partially embedded therein. Protective cover layer 15 is composed, at least partially, especially predominantly or completely, of a ceramic material containing, for example, zirconium oxide ($ZrO_2$), and/or a glass containing, for example, zinc oxide (ZnO) and/or boron trioxide ($B_2O_3$) and/or aluminum oxide ($Al_2O_3$) and/or bismuth oxide ($Bi_2O_3$). The protective cover layer 15 can advantageously be produced by applying on the coil wire 14 already wound on the coil carrier 12 a corresponding glass—, or ceramic, paste and thereafter firing at firing temperatures not destroying the insulating layer jacketing the coil wire. In an additional embodiment of the invention, the protective cover layer is manufactured of a material conforming to EU-Directive 2011/65/EU (ROHS 2) and/or having a CAS Registry Number 65997-17-3 and/or having a firing temperature of less than 800° C., for example, a bismuth-aluminum-silicate-glass containing ZnO at a mass fraction of 3-12%, $B_2O_3$ at a mass fraction of 5-15 m %, $Al_2O_3$ at a mass fraction of 1-5% and $Bi_2O_3$ at a mass fraction of 60-75%.

In an additional embodiment of the invention, the coil includes, furthermore, a base 11 having a first end 11+ formed by a first end face and a second end 11# distal to the end 11+ and formed by a second end face, for example, a second end face parallel to the first end face. The—here circularly cylindrical, or disc shaped—base 11 can, for example, same as the coil carrier, be made of a metal material, for example, steel or titanium, or a titanium-alloy, or, for example, also a ceramic. Base and coil carrier are, in such case, adapted to be mechanically connected with one another, for example, also releasably, by means of a screw 13. For such purpose, the base 11 of this embodiment has a passageway 11A, for example, a straight and circularly cylindrical, passageway 11A, extending from its end 11+ to its end 11# and the coil carrier 12 has a passageway 12A, for example, a straight and sectionally circularly cylindrical passageway 12A, extending from its end 12+ to its end 12#. Furthermore, the coil carrier 12 is so arranged relative to the base 11 that the second end face of the coil carrier faces the base 11—here namely, for example, the first end face of the base 11—and the passageway 12A of the coil carrier 12 aligns with the passageway 11A of the base, and, indeed, in such a manner that, such as directly evident from the combination of FIGS. 1, 2 and 3, the screw 13—, for example, embodied as a flat head screw—is so positioned that it is accommodated partially by the passageway 11A, as well as also partially by the passageway 12A. In order to enable a screwed joining of the coil 1 with additional add-on parts, or to provide easy connection opportunities for the coil 1, screw 13 is dimensioned in an embodiment of the invention relative to the particular lengths of the two passageways 11A, 12A, such that it extends beyond the second end of the base, once it is positioned in the two passageways 11A, 12A. To establish a screwed connection of base 11 and coil carrier 12 relative to one another, for example, a nut can be provided, which is rotated onto the extension of screw 13 to bear against the base 11; the screwed connection can, however, for example, also be produced, as schematically indicated in FIG. 3, by providing an internal thread on the inner wall of the base 11 surrounding passageway 11A of the base 11, such that the external thread of the screw 13 engages with the internal thread of base 11.

Figure 4:
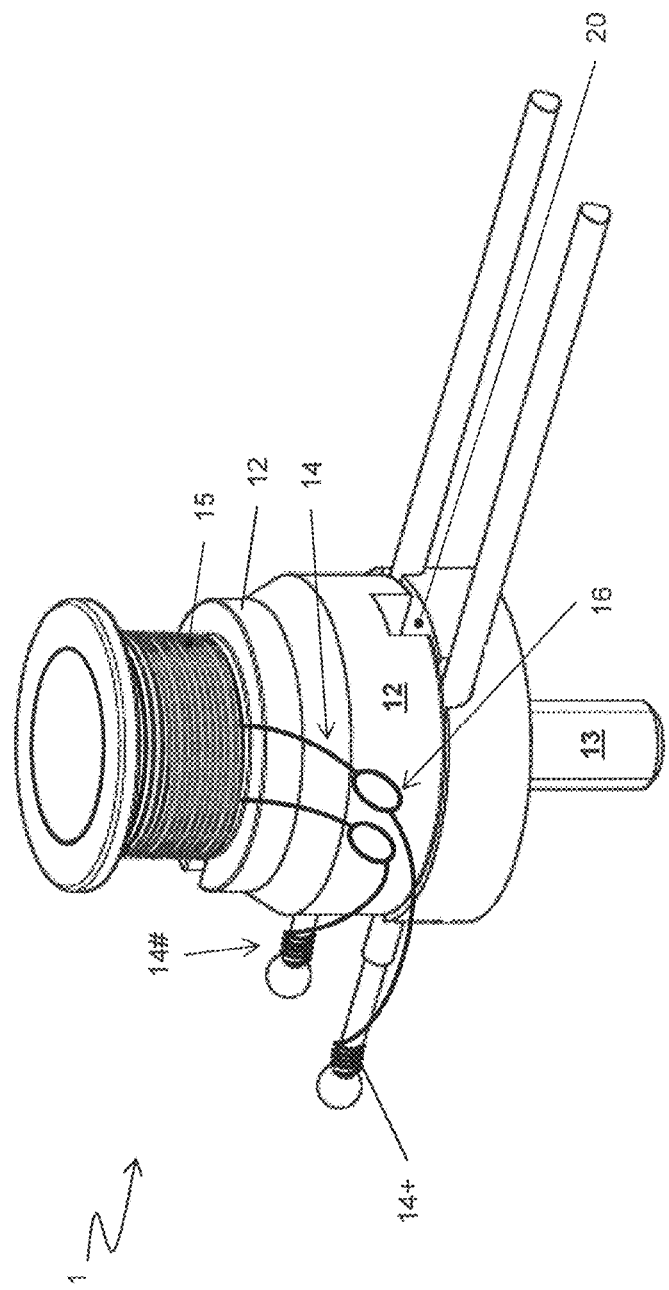
FIG. 4 shows another example of an embodiment of a coil of the present disclosure.

In an additional embodiment of the invention, —, as indicated in FIG. 4—, a first subsection of the coil wire 14, for example, a first subsection led along a first imaginary surface element of the coil carrier 12, and a second subsection of the coil wire 14 spaced from the first subsection of the coil wire 14, for example, a second subsection led along a second imaginary surface element of the coil carrier 12 spaced from the above described surface element, are each secured on the coil carrier 12 by means of a ceramic adhesive 16, for example, a 1- or even 2-component ceramic adhesive applied on the first and second subsections as well as on subsections of the coil carrier. Advantageously applied as ceramic adhesive can be, for example, that available from the firm, Aremco Products, Executive Blvd., Valley Cottage, NY under the designation Cerambond 571 or a like ceramic adhesive.

For electrical connection with a spatially remote electronic circuit (not shown), for example, an electronics of a vibronic measuring device, or with some other electrical component, coil 1 includes, furthermore, a first connection line 111 comprising at least one conductor 111A of electrically conductive material as well as at least a second connection line 112 comprising at least one conductor 112A of electrically conductive material. The conductors of the connection lines 111, 112 can be, for example, of the same material, respectively, for example, in each case, of silver or a silver alloy or copper or a copper alloy. Each of the connection lines 111, 112 includes, as evident from FIGS. 1 and 2, additionally, a, for example, tubular, insulation 111B, 112B of an electrically non- or poorly conducting material jacketing the particular conductors 111A, 112A. Particularly for the mentioned case, in which the coil 1 serves as a component of a measuring transducer of vibration-type, such that the coil is exposed to mechanical oscillations during operation, the connection lines 111, 112 have, according to an additional embodiment, in each case, a textile insulation for the electrical insulation of the conductors, for example, an electrical insulation produced by means of glass fibers. Alternatively thereto or in supplementation thereof, the insulation can, however, for example, also be formed by means of a homogeneous lacquer layer or a plastic sleeve jacketing the conductors. As shown schematically in FIG. 1, the conductor of the connection line 111 is electrically conductively connected, for example, by material bonding, thus by a soft- or hard soldered, or brazed, connection, with an exposed (i.e., not coated with insulation), first end 14+ of the coil wire and the conductor of the connection line 112 is electrically conductively connected, for example, here also by material bonding, thus by a soft- or hard soldered, or brazed, connection, with a second end 14# (likewise not coated with insulation) of the coil wire.

In the case of the coil 1 shown in each of FIG. 1, 2, 3, or 4, an intermediate space 20 occurring between the second end face of the coil carrier and the first end face of the base can also be advantageously used supplementally to affix the connection lines 111, 112, in such a manner that a strain relief for connection lines 111, 112 is provided for protecting the above-mentioned connections between the connection lines 111, 112 and the coil wire 14—namely the connection produced between the conductor of the connection line 111 and the end 14+ of the coil wire, and the conductor of the connection line 112 and the end 14# of the coil wire—, and the coil wire 14 per se, against possible overloadings and destruction associated therewith, for instance, as a result of tensile- or even shaking forces acting on the connection lines. Accordingly, in the case of this embodiment of the coil 1, each of the at least two connection lines 111, 112 can be placed in the installed position, in each case, partially in the intermediate space 20 formed between coil carrier and base, in order to be secured there by means of a frictional locking resulting from the interaction of the connection lines, base, coil carrier and screw. In the example of an embodiment shown in FIGS. 1, 2, 3, and 4, screw 13 forms a screwed connection, which exerts an axial clamping force on the coil carrier, namely a force acting in the direction of an imaginary longitudinal axis of the screw, for instance, in such a manner that coil carrier and/or screw experience resulting elastic deformations. Thus, base 11, coil carrier 12 and connection lines 111, 112 can be adapted to bring about a force-based securing of the connection lines in the intermediate space 20 by exploiting restoring—, or clamping, forces generated by elastic deformations of coil carrier, and screw. The level of the clamping forces, or the resulting static friction, securing the connection lines can be appropriately set by means of the screw, in particular, a tightening torque applied to the screw. Especially in the case of application of connection lines having textile insulation for the conductors, it can, additionally, be advantageous, to let the insulation extend at least into the intermediate space 20, ideally, however, —such as shown in FIGS. 1, 3, and 4—also slightly beyond, in such a manner that sections of each of the conductors 111A, 112A located within the intermediate space 20 are jacketed by insulation 111B, respectively 112B. In this way, on the one hand, very high retention forces for the force-based interlocking securing of the connection lines 111, 112 can be achieved and, on the other hand, in very simple, equally as well, effective manner, a separation or ripping of the insulation is prevented, or at least further propagation of possible cracks in the insulation safely suppressed.

Figure 5:
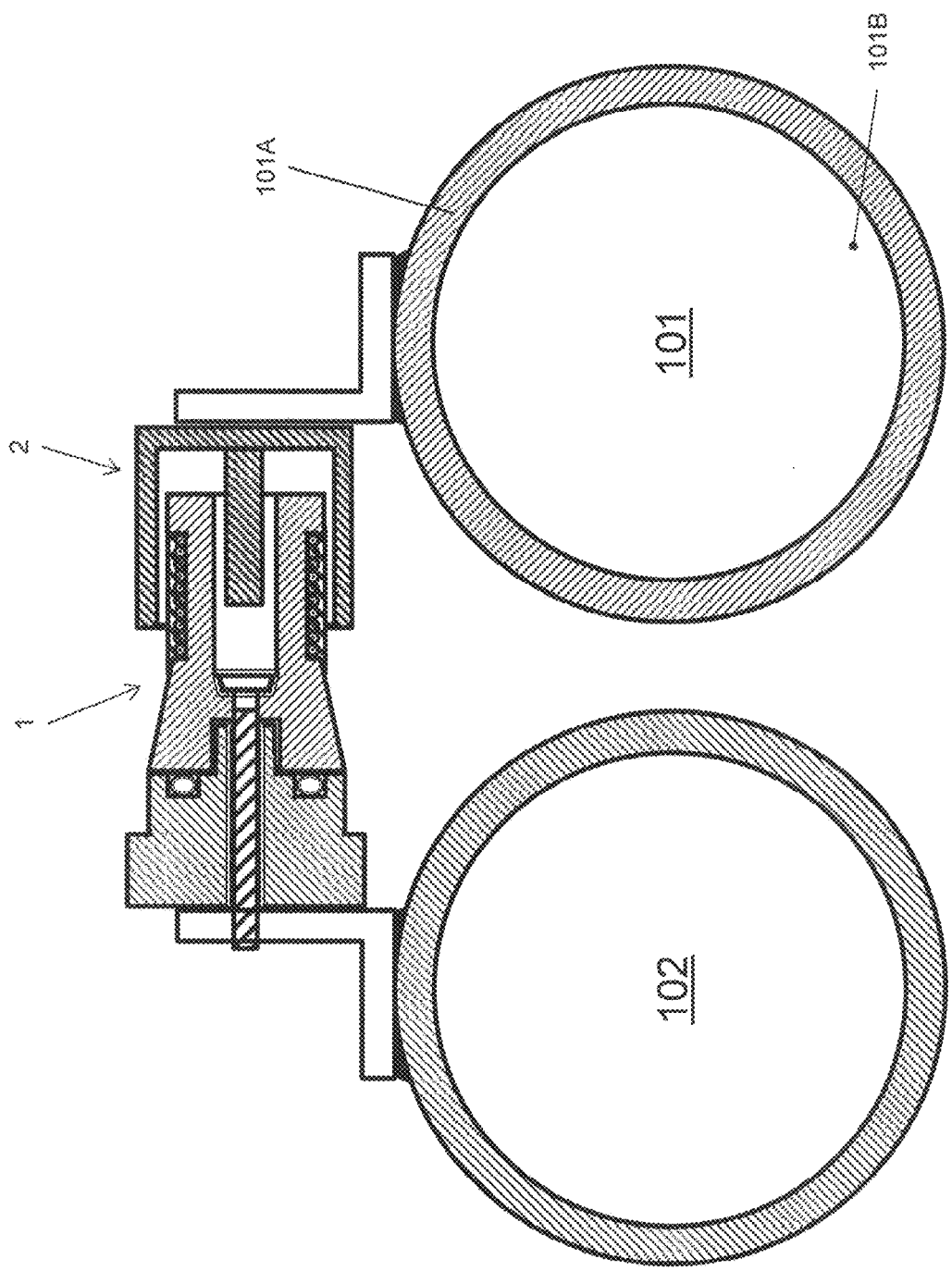
FIG. 5 shows in a sectioned, side view, a measuring tube of a measuring transducer of vibration-type having a permanent magnet secured thereto and a coil of the present disclosure interacting with the permanent magnet.

As already mentioned, the coil of the invention is, especially, also provided to serve as a component of a measuring transducer of vibration-type, for example, an oscillation exciter or an oscillation sensor, for instance, a vibronic measuring device formed by means of such a measuring transducer, for example, a Coriolis, mass flow measuring device, density-measuring device or viscosity-measuring device. Such a measuring transducer includes, such as schematically shown in FIG. 5, at least one measuring tube 101 having a lumen 101B surrounded by a tube wall 101A. The at least one—, for example, at least sectionally straight and/or at least sectionally curved—measuring tube is especially adapted to convey in its lumen 101B a flowable, or at least at times flowing, medium, for example, a gas or a liquid, and during that to be caused to vibrate, for example, in order to cause the at least one measuring tube to execute mechanical oscillations about its static rest position, oscillations which are suitable to induce in the flowing medium Coriolis forces dependent on a mass flow rate m, and/or which are suitable to induce in the flowing medium frictional forces dependent on a viscosity η of the medium, and/or which are suitable to induce in the flowing medium inertial forces dependent on a density ρ of the medium. Especially, the measuring transducer is also provided for applications, in which the medium to be measured has, at least at times, a temperature over 350° C., especially greater than 400° C. The measuring transducer includes, furthermore, a permanent magnet 2 connected with the at least one measuring tube 101—here namely secured externally on its tube wall 101A, for example, a tube wall of a stainless steel, titanium, tantalum, zirconium or a nickel based alloy. Coil 2 is, in turn, mounted such that it is permeated by a magnetic field of the permanent magnet. For example, the coil 2 can, such as shown in FIG. 5, be secured on an, in given cases present, additional measuring tube 102, especially an additional measuring tube embodied equally to measuring tube 101, or, however, also—such as quite usual in the case of measuring transducers of vibration-type having a single measuring tube—be secured on an, in given cases present, counteroscillator operationally not flowed-through by a medium to be measured. The measuring transducer can—such as already indicated—, furthermore, be a component of a (vibronic) measuring system serving for measurement of at least one measured variable, for example, a temperature, a mass flow rate, a density and/or a viscosity, of a flowing fluid, especially a gas, a liquid or a flowable dispersion, and/or such having a temperature greater than 350° C., especially greater than 400° C., which measuring system includes, moreover, a measuring- and operating electronics electrically connected with the measuring transducer, especially its coil(s) and/or a measuring- and operating electronics formed by means of a microprocessor.

The invention claimed is:

1. A measuring system for measurement of at least one measured variable of a flowing fluid or of a fluid having a temperature greater than 350° C., the measuring system comprising:

a measuring- and operating electronics, including a microprocessor; and
   a measuring transducer including:
      at least one measuring tube having a lumen surrounded by a tube wall and adapted to convey in the lumen a flowable medium having, at least at times, a temperature greater than 350° C., wherein the tube is embodied to execute mechanical oscillations about a static rest position;
      a permanent magnet connected with the at least one measuring tube; and
      a coil including:
         a coil carrier;
         a coil wire having a diameter of not less than 0.05 mm but less than 0.5 mm and composed of silver or a silver alloy and jacketed by an insulating layer of a high temperature resistant ceramic material, wherein the high temperature resistant ceramic material includes aluminum oxide ($Al_2O_3$) and/or silicon oxide ($SiO_3$), wherein the coil wire is wound around the coil carrier; and
         a protective cover layer composed of a ceramic material or a glass and covering the coil wire wound around the coil carrier,
      wherein the coil is permeated by a magnetic field of the permanent magnet.

2. The measuring system of claim 1, wherein the coil wire includes AgNiO 15.

3. The measuring system of claim 1, wherein the protective cover layer is a ceramic material containing zirconium oxide ($ZrO_2$) or is a ceramic material conforming to EU-Directive 2011/65/EU (ROHS 2).

4. The measuring system of claim 1, wherein the protective cover layer is a glass conforming to EU Directive 2011/65/EU (ROHS 2).

5. The measuring system of claim 1, wherein the protective cover layer is a glass having CAS Registry Number 65997 17 3.

6. The measuring system of claim 1, wherein the protective cover layer is a glass containing at least one of the following: boron trioxide ($B_2O_3$), aluminum oxide ($Al_2O_3$), bismuth oxide ($Bi_2O_3$), and zinc oxide (ZnO).

7. The measuring system as claimed in claim 1, wherein a first subsection of the coil wire led along a first surface element of the coil carrier and a second subsection of the coil wire led along a second surface element of the coil carrier spaced from the first surface element are secured to the coil carrier by a ceramic adhesive, including a 1-component or a 2-component ceramic adhesive.

8. The measuring system as claimed in claim 1, wherein the coil carrier is composed at least partially of a ceramic material containing zirconium oxide ($ZrO_2$) or containing a Y-stabilized zirconium oxide ($ZrO_2$).

9. The measuring system as claimed in claim 1, wherein the protective cover layer is a glass containing at least one of the following: zinc oxide (ZnO) at a mass fraction of 3-12%, boron trioxide ($B_2O_3$) at a mass fraction of 5-15%, aluminum oxide ($Al_2O_3$) at a mass fraction of 1-5%, and bismuth oxide ($Bi_2O_3$) at a mass fraction of 60-75%.

\* \* \* \* \*